US008362420B2

(12) United States Patent
Clemmer et al.

(10) Patent No.: US 8,362,420 B2
(45) Date of Patent: Jan. 29, 2013

(54) APPARATUS AND METHODS FOR ANALYZING IONS

(75) Inventors: David E. Clemmer, Bloomington, IN (US); Samuel I. Merenbloom, El Cerrito, CA (US); Stormy L. Koeniger, Evanston, IL (US); Stephen J. Valentine, Bloomington, IN (US)

(73) Assignee: Indiana University Research and Technology Corporation, Indianapolis, IN (US)

( * ) Notice: Subject to any disclaimer, the term of this patent is extended or adjusted under 35 U.S.C. 154(b) by 590 days.

(21) Appl. No.: 12/439,108

(22) PCT Filed: Aug. 31, 2007

(86) PCT No.: PCT/US2007/077452
§ 371 (c)(1),
(2), (4) Date: Apr. 19, 2010

(87) PCT Pub. No.: WO2008/028159
PCT Pub. Date: Mar. 6, 2008

(65) Prior Publication Data

US 2010/0193678 A1 Aug. 5, 2010

Related U.S. Application Data

(60) Provisional application No. 60/824,319, filed on Sep. 1, 2006.

(51) Int. Cl.
*B01D 59/44* (2006.01)

(52) U.S. Cl. ........ 250/287; 250/281; 250/282; 250/283; 250/286; 250/288; 250/289

(58) Field of Classification Search .......... 250/281–283, 250/286–292
See application file for complete search history.

(56) References Cited

U.S. PATENT DOCUMENTS

| | | | | |
|---|---|---|---|---|
| 5,905,258 | A | 5/1999 | Clemmer et al. | |
| 6,040,573 | A * | 3/2000 | Sporleder et al. | 250/281 |
| 7,095,019 | B1 | 8/2006 | Sheehan et al. | |
| 2010/0243883 | A1* | 9/2010 | Vidal-De-Miguel | 250/282 |
| 2011/0121171 | A1* | 5/2011 | Clemmer et al. | 250/282 |

OTHER PUBLICATIONS

PCT International Search Report for PCT/US2007/077452 completed by the US Searching Authority on Mar. 10, 2008.

* cited by examiner

*Primary Examiner* — Jack Berman
*Assistant Examiner* — Meenakshi Sahu
(74) *Attorney, Agent, or Firm* — Barnes & Thornburg, LLP

(57) ABSTRACT

An apparatus (10) for separating Ions based on ion mobility includes a conduit (12) defining a closed path. The conduit is configured such that a uniform electric field is produced about the closed path upon application of a voltage causing ions within the conduit (12) to move about the closed path and to separate the ions based upon ion mobility. A method of separating a plurality of ions is also disclosed.

22 Claims, 8 Drawing Sheets

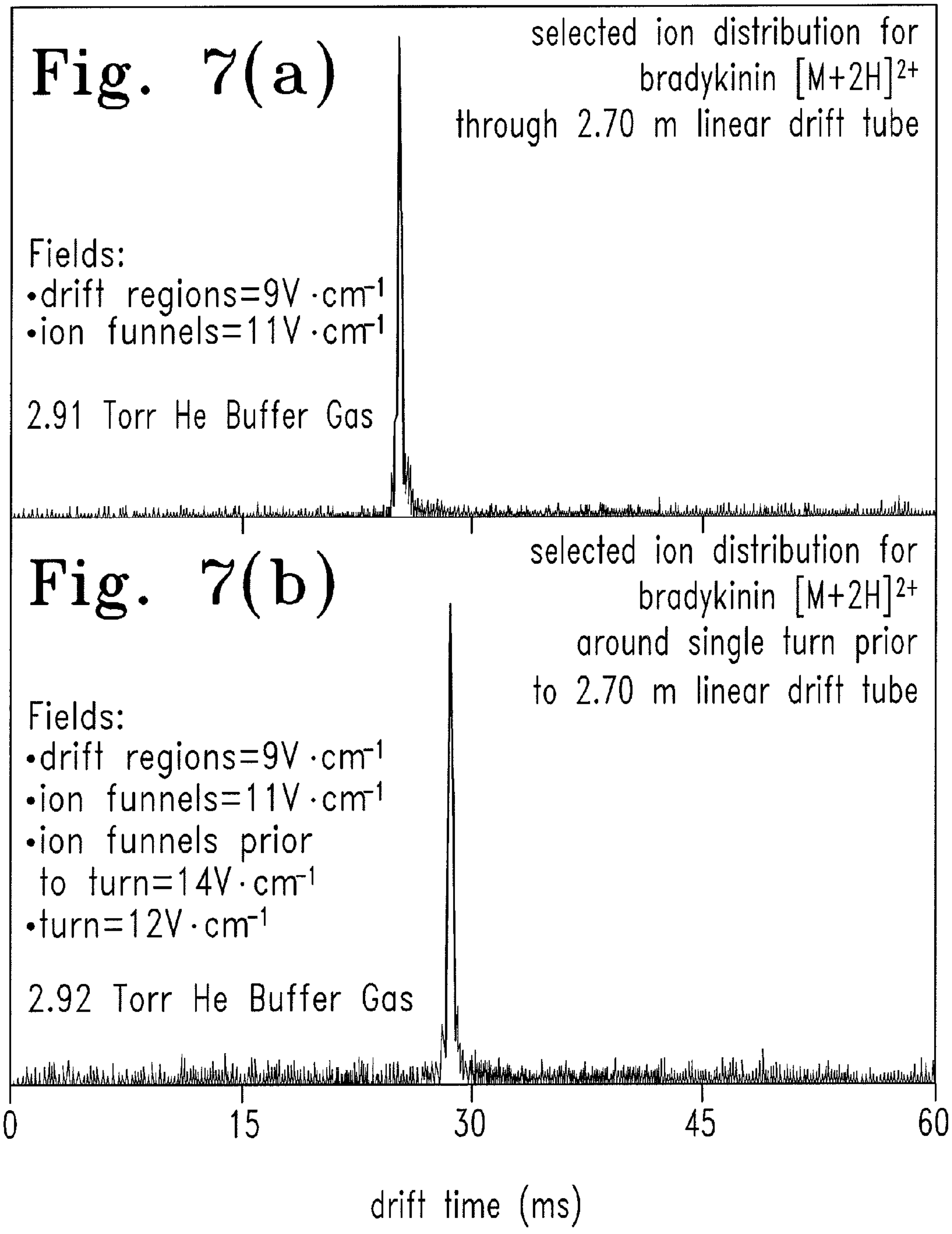
Fig. 7(a)
selected ion distribution for
bradykinin [M+2H]2+
through 2.70 m linear drift tube
Fields:
•drift regions=9V·cm-1
•ion funnels=11V·cm-1
2.91 Torr He Buffer Gas
Fig. 7(b)
selected ion distribution for
bradykinin [M+2H]2+
around single turn prior
to 2.70 m linear drift tube
Fields:
•drift regions=9V·cm-1
•ion funnels=11V·cm-1
•ion funnels prior
to turn=14V·cm-1
•turn=12V·cm-1
2.92 Torr He Buffer Gas
0
15
30
45
60
drift time (ms)

APPARATUS AND METHODS FOR ANALYZING IONS

CROSS REFERENCE TO RELATED APPLICATION

This application is a U.S. national counterpart application of international application serial No. PCT/US2007/077452 filed Aug. 31, 2007, which claims priority to U.S. Provisional Patent Application No. 60/824,319 filed Sep. 1, 2006. The entireties of both of the disclosures are incorporated herein by reference.

GOVERNMENT RIGHTS

This invention was funded in part by grants from the National Science Foundation, NSF (Grant No. CHE-0078737) and the National Institutes of Health, NIH (Grant No. AG-024547); the United States Government has certain rights in this invention.

BACKGROUND

Ion mobility spectrometry allows detection and identification of very low concentrations of chemicals based upon the differential migration of gas phase ions through a homogeneous electric field. Furthermore, ion mobility spectrometry has been performed using linear drift tubes for analysis.

SUMMARY

According to one aspect of the disclosure, an apparatus for separating ions based on ion mobility includes a conduit defining a closed path. The conduit is configured such that a uniform electric field is produced about the closed path upon application of a voltage causing ions within the conduit to move about the closed path and to separate the ions based upon ion mobility.

According to another aspect of the disclosure, a method for separating a plurality of ions includes transmitting the plurality of ions into a conduit configured to provide a closed path for the ions. The method further includes exposing the plurality of ions to a uniform electric field within the closed path to causing the number of ions to separate based on ion mobility.

BRIEF DESCRIPTION OF THE FIGURES

The detailed description particularly refers to the accompanying figures in which:

FIG. 3(*b*) is a contour plot of the portion shown in FIG. 3(*a*);

FIG. 4(*b*) is a diagrammatic view of another ion conduit configuration;

FIG. 7(*a*) is a plot showing experimental results; and

FIG. 7(*b*) is another plot showing experimental results.

DETAILED DESCRIPTION OF THE FIGURES

Figure 1:
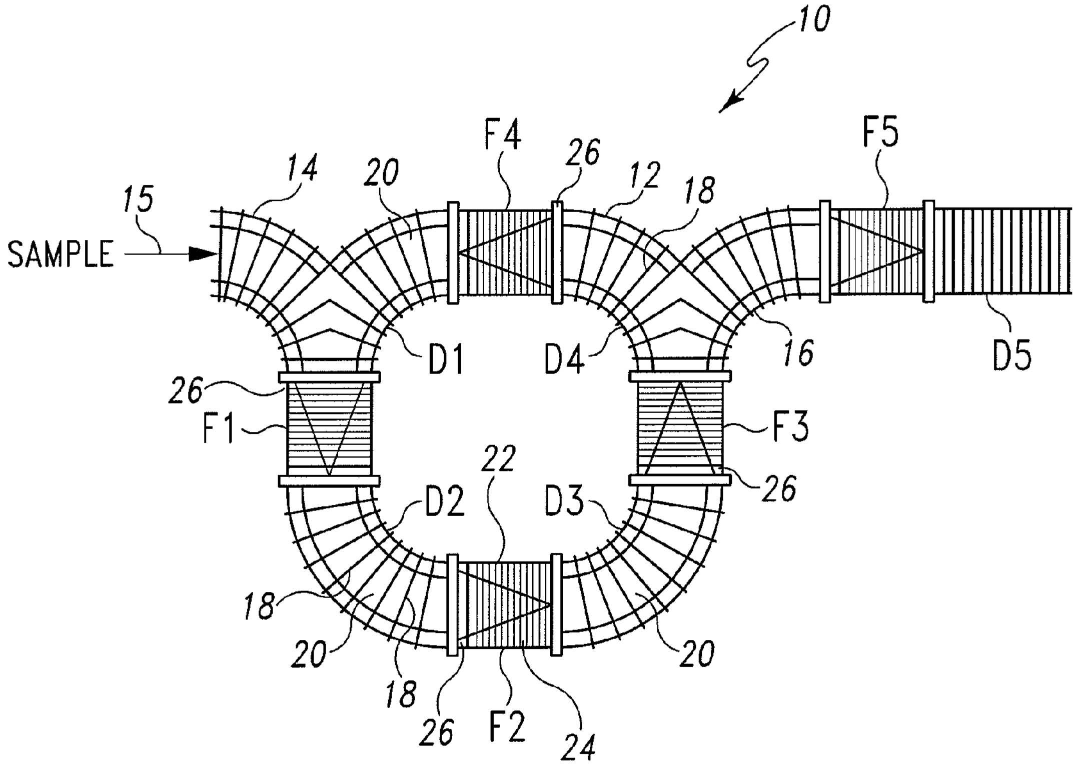
FIG. 1 is a side view of an apparatus for separating ions as a function of ion mobility.

As will herein be described in more detail, FIG. 1 shows an illustrative embodiment of an apparatus 10 configured to separate ions based upon mobility of the ions. Apparatus 10 includes an ion conduit 12. In this illustrative embodiment, the apparatus 10 further includes an inlet tube 14 and an outlet tube 16.

The ion conduit 12 includes a number of drift tubes D1-D4 and number of ion funnels F1-F4, the operation of which are described herein. The drift tubes D1-D4 link the ion funnels F1-F4 together such that the tubes D1-D4 and the funnels F1-F4 are in fluid communication with one another to define a closed path. As shown in FIG. 1, the inlet tube 14 is integrally formed with the drift tube D1 and the outlet tube 16 is integrally formed with the drift tube D4. An ion funnel F5 is connected to an end of the outlet conduit 16 and the ion funnel F5 is connected to a drift tube D5.

Figure 5:
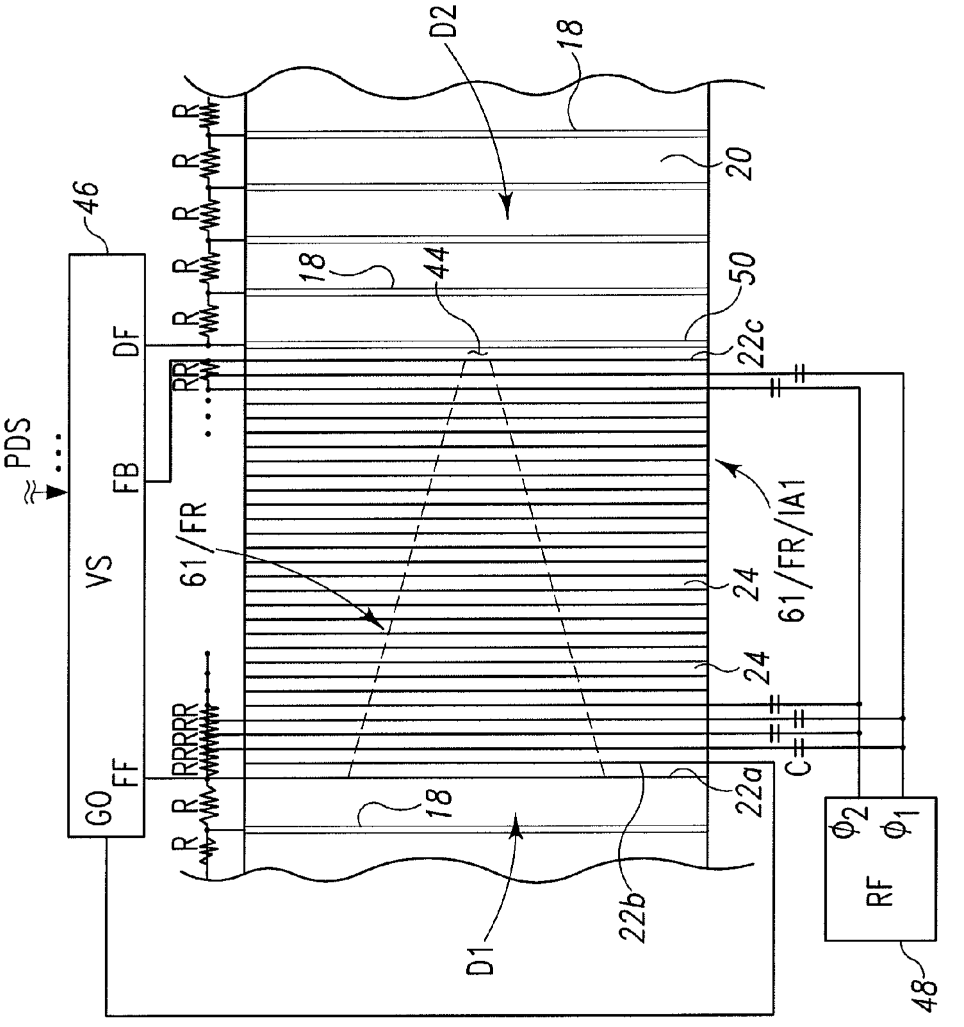
FIG. 5 is a detailed view of an ion funnel.

The drift tubes D1-D5, ion funnels F1-F5, as well as the inlet and outlet tubes 14, 16 may illustratively include a number of adjacent alternating electrically conductive rings 18 and electrically insulative rings 20. The insulative rings 20 may be formed of Delrin® acetal resin although other electrically insulating materials may alternatively or additionally be used. It will be understood, however, that the drift tubes D1-D5, ion funnels F1-F5, inlet tube 14, and outlet tube 16 may alternatively be constructed using other conventional components and/or techniques. For example, the drift tubes D1-D5 may include a tube made of an electrically insulative material such as TEFLON™. The tube may then be inserted through a number of electrically-conductive rings as an alternative to that shown in FIG. 1. The electrically conductive rings 18 are connected to one another by resistive elements (e.g., see FIG. 5) which allows a DC voltage source (not shown) to be connected to each drift tube thereby creating an electric field within each tube. In one illustrative embodiment, the voltage source is connected to an end of a drift tube allowing the voltage to drop across each resistive element. If the resistive elements are equal, as shown in FIG. 5, the voltage drop is also equal across each resistive element providing an electric field in the tube that linearly decreases along the length of the tube.

The creation of the electric fields allows ions in the tubes to be conducted therethrough based on the field strength direction and the polarity of the ions. For example, if an electric field is present in the drift tube D2 that decreases in strength from funnel F1 to F2, positively charged ions will drift away from the funnel F1 and towards the funnel F2. Within each drift tube D1-D4, the ions can travel approximately in a 90° path, which is further illustrated in FIGS. 2 and 3(*a*)-(*b*).

Figure 2:
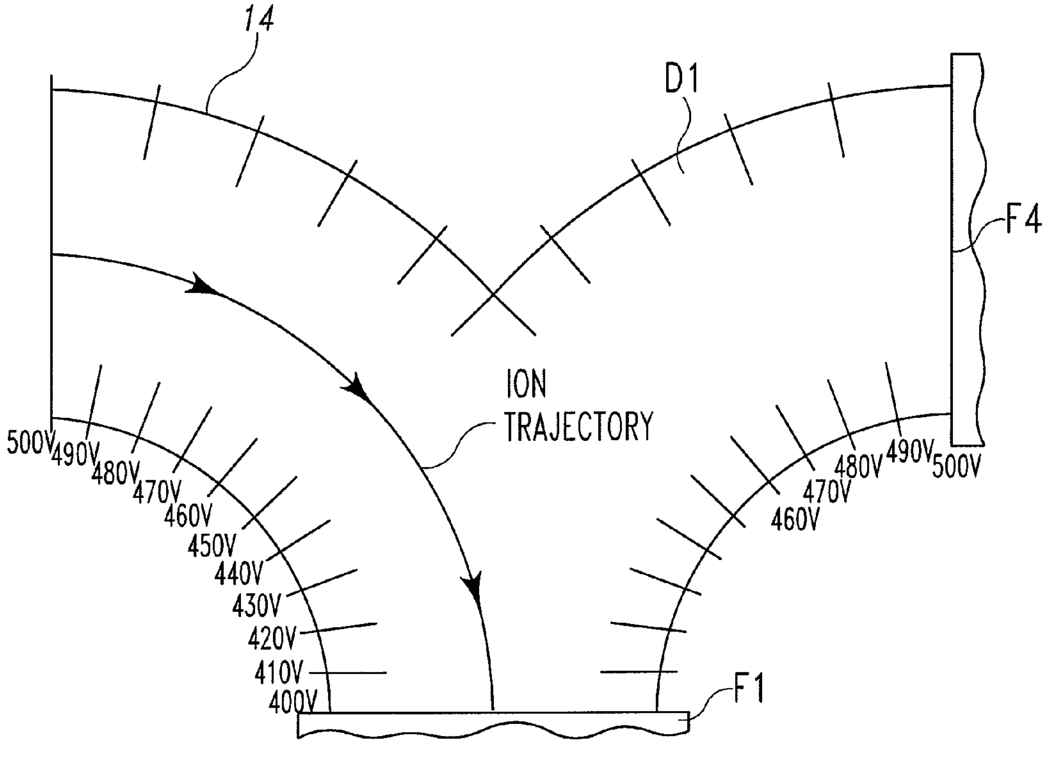
FIG. 2 is diagrammatic view of a portion of the apparatus of FIG. 1.

In the illustrative embodiment shown in FIG. 2, the voltage potential applied to the end of the inlet conduit 14 receiving the sample and the interface of the funnel F4/tube D1 is 500 V and is reduced to 400 V over the distance to the funnel D1 so that voltage is linearly decreased across the tubes 14, F1, however, it should be appreciated that various magnitudes and polarities of voltages may be used. In this illustrative embodiment, the applied voltage forces a positively charged ion that enters the inlet conduit 14 to travel through the inlet conduit 14 and into the drift tube D1 as illustrated in FIG. 2. By linearly decreasing the voltages in this manner, the ions will travel into the conduit 12 in a counterclockwise fashion with respect to the configuration shown in FIG. 2 and will not travel clockwise through the conduit 12 as long as the voltages are applied in this manner. A voltage may be applied to each of the other drift tubes D2-D5 to allow transmission of the ions through the conduit 12 in a manner similar to that described in regard FIG. 2.

Figure 3A:
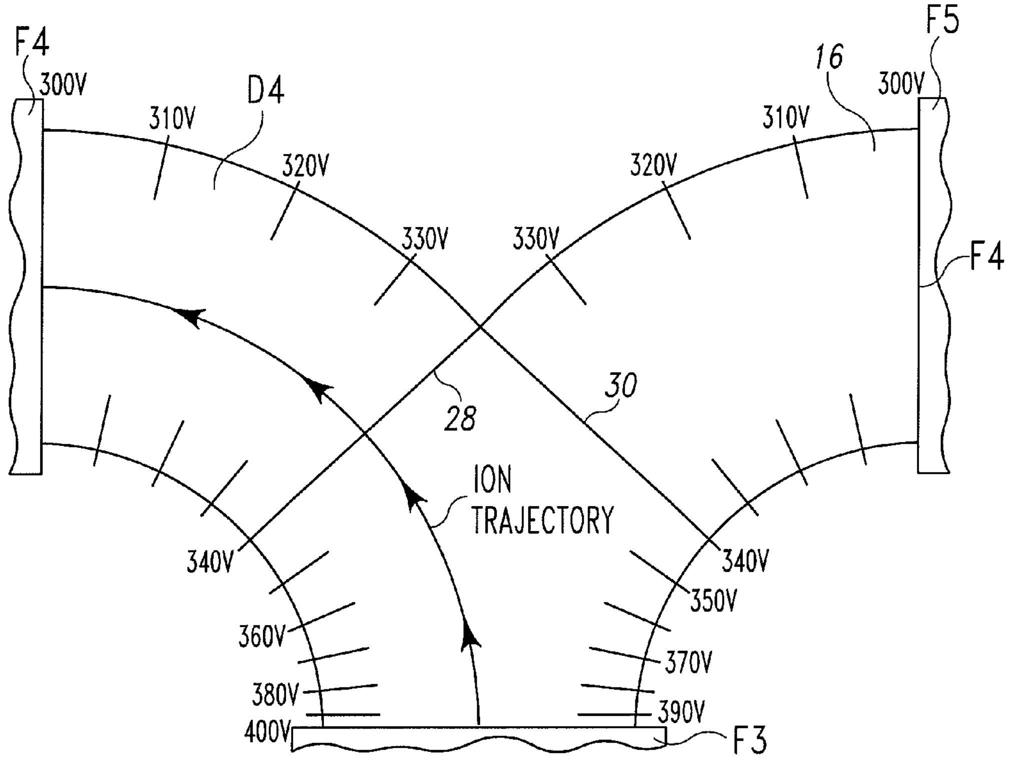
FIG. 3(*a*) is a diagrammatic view of another portion of the apparatus of FIG. 1.
Figure 3B:
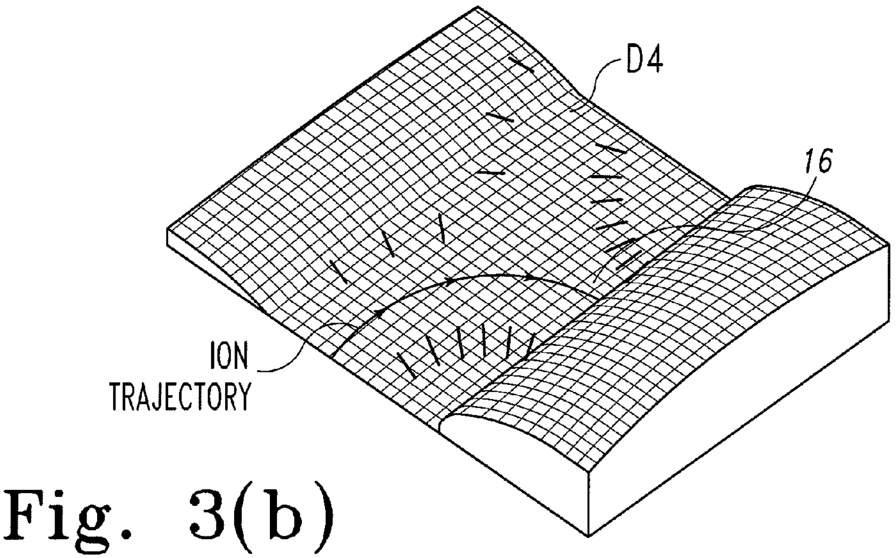

Both the drift tube D4 and the outlet tube 16 each include electrode rings 18, which may be operated as gate electrodes 28, 30, respectively. The gate electrodes 28, 30 may be electrically connected to a voltage source (not shown) and operated independently of their respective tubes as well as each other such that each gate electrode 28, 30 can be independently energized at different voltages. This allows the path of any ions in the drift tube D4 to be manipulated as shown in FIGS. 3(*a*) and 3(*b*). FIG. 3(*a*) shows an illustrative manner in which the gate electrodes 28, in the drift tube D4 may be controlled to transmit ions into either the outlet tube 16 or remain in the conduit 12. In particular, the gate electrodes 28, 30 are operated at different voltages from one another. In the illustrative embodiment of FIG. 3(*a*), the gate electrodes 28, 30 are operated at voltages 20 V different from one another, such as 340V and 360V respectively. The ions will travel through the conduit 12 and be repelled from traveling into the outlet tube 16. To transmit the ions to the outlet tube 16, the gate electrode voltages are switched, such that the gate electrodes 28, 30 are each at a potential voltage of 360V and 340V, respectively. This will cause the ions to travel through the outlet tube 16 to the ion funnel F5. FIG. 3(*b*) shows a contour plot representing the gate electrodes 28, 30 being operated at different voltages, and specifically the gate electrode 28 being operated at 360 V and the gate electrode 30 at 340 V, allowing the ion to be transmitted into outlet conduit 16.

The ion funnels F1-F5 also each illustratively include a number of compressed alternating electrically conductive and electrically insulative rings 22, 24. Similar to the drift tubes D1-D5, the electrically conductive rings are connected to one another through resistive elements of equal resistance (e.g., see FIG. 5). The rings 22, 24 may be configured concentrically and have inner diameters that decrease linearly to provide a "funnel shape" within each ion funnel F1-F5 as diagrammatically shown in FIG. 1 and further shown in detail in FIG. 5. As further described in regard to FIG. 5, the rings 22 may be supplied with both a DC voltage and a number of radio frequency (RF) voltages to provide an electric field within each ion funnel F1-F5 that can trap ions therein and transmit focused stream of the ions into an adjacent drift tube D1-D5.

During general operation, a previously-ionized sample may be transmitted into the inlet tube 14 as indicated by arrow 15. It should be appreciated that ionization of the sample can be performed through various manners such as matrix-assisted laser desorption/ionization (MALDI), electrospray ionization (ESI), electron ionization (EI), desorption electron spray ionization (DESI), photoionization, and radioactive ionization, for example. The conduit 12 is typically filled with a high pressure buffer gas, such as helium, for example, however, other buffer gases may be used. In one illustrative mode of operation, a voltage is applied to both the inlet tube 14 and the drift tube D1 in the manner shown in FIG. 2. The ions will travel into the drift tube D1 towards the ion funnel F1, where they may be transmitted through the ion funnel F1 into the drift tube D2. While moving through the drift tube D2 due to the electric field being applied, the ions begin to separate over time based on their respective mobilities. This allows certain ion packets of common mobilities to be trapped in the ion funnels F1-F5. If the voltage at the ion funnels F1-F5 is kept at a voltage below that applied to the drift tubes D1-D5 at the respective interfaces, certain positively-charged ions may be trapped in the ion funnels F1-F5. If the voltage applied to the ion funnels F1-F5 is held at a level higher than the voltage applied to the drift tubes D1-D5, the positively-charged ions will be transmitted therethrough.

With the ion funnels F1-F5 able to operate in this illustrative manner, the ion conduit 12 may define a closed path through which ions may travel over multiple cycles. This allows the ions to separate from one another based on mobility such that groups of ions having the same mobility will group together as they travel through the conduit 12. For example, ions may enter into the drift tube D1 from the inlet tube 14 and then be transmitted through the funnel F1. The ions may separate into ion mobility-dependent groups as they travel through the drift tube D2.

The ion funnels F1-F4 are also able to focus the trapped ions into a more concentrated beam for transmission. The ability of the funnels F1-F4 to trap ions allows ions to be held in the funnels F1-F4 while the voltages supplied to the drift tubes D1-D4 are reset. This allows the ions to be transmitted throughout the conduit 12 with a finite voltage source that can be continuously reset while allowing a number of revolutions through the conduit 12. It should be appreciated that this allows ions to travel unlimited times around the conduit, which increases the resolution of ion mobility analyses with respect to linear ion mobility apparatus, for example. The voltage waveforms (e.g., a sawtooth waveform) applied the drift tubes D1-D4 and the ion funnels F1-F4 can also be varied such that ion transmission may be controlled in a particular manner.

Figure 4A:
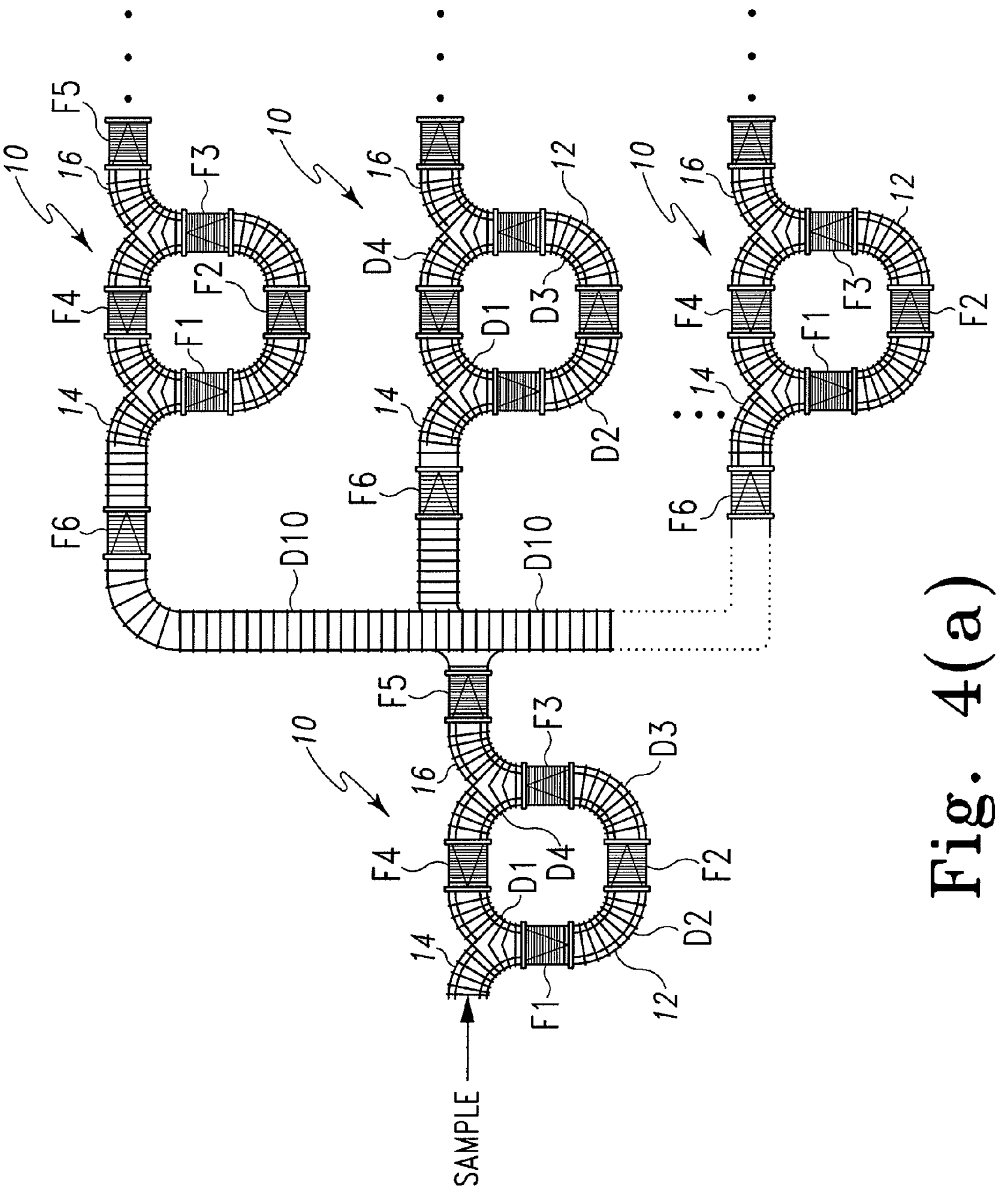
FIG. 4(*a*) is a diagrammatic view of an ion conduit configuration.
Figure 4B:
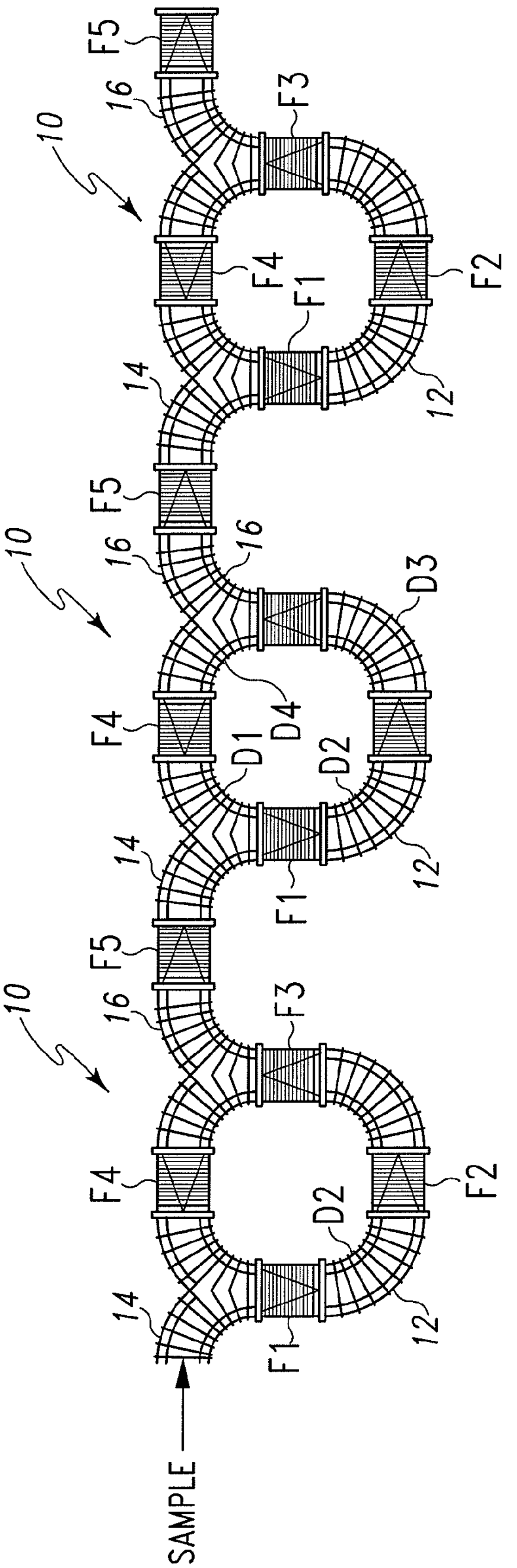

Once a particular group of ions is desired to be transmitted through the outlet tube 16, the gate electrodes 28, 30 may be operated as previously described when the ions are in the drift tube D3 to cause the ions to enter the outlet tube 16. Once in the outlet tube 16, the ions may be conducted through drift tube D5 for various applications. In one exemplary embodiment, ions traveling through the drift tube D5 may be sent into another apparatus 10. FIGS. 4(*a*)-4(*b*) shows a number of apparatus 10 connected to one another allowing various groups to be transmitted into one or more of the apparatus 10. This allows more ion separation to occur for various groups of ions. FIG. 4(*a*) illustrates a "parallel" arrangement in which the apparatus 10 receiving a sample has its outlet tube 16 connected to a number of apparatus 10. A drift tube D10 is used along with ion funnels F6 to connect each "parallel" apparatus 10 to the sample-receiving apparatus 10. The drift tube D10 and ion funnels F6 can be operated in a manner similarly described in regard to the other drift tubes and ion funnels allowing ions to be moved to any of the parallel apparatus 10. It should be appreciated that each outlet tube 16 shown unconnected may be connected to other apparatus 10 or connected to other instrumentation. This illustrative arrangement allows ions of various mobilities to exit the apparatus 10 based on mobility, such that ions of a certain mobility may be sent into another apparatus 10. The gating of inlet tubes 14 may determine, which apparatus 10 will receive a particular ion group exiting the sample-receiving apparatus. It should also be appreciated that some of the outlet tubes 16 shown in FIG. 4(*a*) can be connected to the inlet tube 14 of the apparatus receiving the sample. FIG. 4(*b*) shows a "serial" arrangement of a number of apparatus 10 connected to one another. This arrangement can be configured to allow ion groups of same mobility to exit the sample-receiving apparatus 10 to serially-connected apparatus 10.

Referring again to FIG. 1, in another illustrative mode of operation, ions can be selected by their gas phase mobilities at the entrance of both funnels F2 and F4. To increase the sensitivity, a specific ion may be selected at the funnel F2, and transmitted to the funnel F4, where the ion is trapped. By repeating this illustrative sequence, the selected ion population may be increased allowing mobility-selective accumulation of low-intensity ions for subsequent analysis and/or reaction. However, it should be appreciated that gas phase mobility selection may be performed using any combination of the funnels in the manner described in regard to ion funnels F2 and F4.

FIG. 5 shows a detailed view of an illustrative embodiment of an ion funnel, such as the ion funnels F1-F5. Referring now to FIG. 5, one illustrative embodiment of the apparatus 10 is shown. The illustrative section shown in FIG. 5 includes the end of the drift tube D1, the ion funnel F1, and the beginning of the drift tube D2. The ion funnel F1 includes a gate G1, funnel region FR, and an activation region IA1. The funnel F1, is illustratively formed in this embodiment by compressing together a number of alternating electrically conductive and electrically insulating ring members 22, 24, respectively, or lenses, similarly as generally described hereinabove with respect to FIG. 1. The gate and funnel region G1/FR generally defined between a first or front lens 22*a* and a last or back lens 22*b*, and the ion activation region 44 (IA), is generally defined between the back lens 22*c* of the gate and funnel region, G1/FR, and the first or front lens 40 of the drift tube D2.

The ion gate of the gate and funnel region, G1/FR, is defined by the first and second lenses 22*a*, 22*b* and the electrically insulating ring member positioned between the lenses 22*a* and 22*b*. It should be appreciated that the lenses 22*a*, 22*b* serve as the gate 26 as described above, which shall be further described in detail. As generally described above in regard to FIG. 1, the funnel structure of the ion gate and funnel region, G1/FR, is defined by a series of alternating electrically conductive ring members and electrically insulating ring members. In the illustrative embodiment of FIG. 5, the funnel structure of the ion gate and funnel region, G1/FR, is formed by compressing together 31 concentric stainless steel electrodes. The 31 concentric stainless steel electrodes have inner diameters that decrease linearly to form the funnel shape.

The section shown in FIG. 5 is controlled by a number of voltage sources. For example, a DC voltage source 46 (VS) supplies a number of DC voltages to the first drift tube D1, the gate and funnel region, G1/FR, to the ion activation region, 44, and to the drift tube region, D2. A radio frequency voltage source 48 (RF) supplies a number of radio frequency (RF) voltages to the ion gate and funnel region, G1/FR. In the illustrated embodiment, the DC voltage source 46 has a funnel front lens output, FF, that is electrically connected to the first lens 22*a* of the second ion gate and funnel region, G1/FR, a gate output, GO, that is electrically connected to the second lens 22*b* of the ion gate and funnel region, G1/FR, a funnel back lens output, FB, that is electrically connected to the last or back lens 22*c* of the ion gate and funnel region, G1/FR, and a second drift tube front lens output, D2F, that is electrically connected to the first or front lens 50 of the drift tube D2. The DC voltage source 46 also has an input receiving a programmable delay signal, PDS, produced by the programmable delay generator that provides control signals accordingly allowing the fields within the drift tubes and ion funnels to be operated so as to appropriately transmit the ions in the manners described herein. The RF voltage source 48 is a conventional RF voltage source, and produces two RF voltages, $\Phi_1$ and $\Phi_2$. The RF voltage $\Phi_1$ is supplied through series capacitors, C, to every other lens of the ion gate and funnel region, G1/FR, and the RF voltage $\Phi_2$ is supplied through series capacitors, C, to the remaining lenses of the ion gate and funnel region, G1/FR. Generally, the $\Phi_1$ and $\Phi_2$ voltages are applied to the ion gate and funnel region, G1/FR beginning with the lens following the second gate lens 22*b* and ending with the lens positioned just prior to the last or back lens 22*c*. The voltages $\Phi_1$ and $\Phi_2$ are, in the illustrated embodiment, 180° out of phase with each other, although the RF voltage source 48 may alternatively be configured to produce voltages at other frequencies and/or with other phase relationships to suit alternate implementations of the apparatus 10.

Also shown in FIG. 5 are a chain of resistors, R, which link the electrically conducting rings 18, 22 together which allows them to be energized to create the electric field linearly decreasing electric field within the drift tubes D1-D5 and the ion funnels F1-F5 as previously described. The chain of resistors, R, is connected across the electrically conductive ring members 18 of the drift tube, D1, is continued across each of the electrically conductive ring members 22 of the second ion gate, funnel and ion activation region, G1/FR/IA1, and also across the electrically conductive ring members of the drift tube, D2, with two exceptions. Specifically, the second lens 22*b* of the ion gate G1 is skipped, i.e., not connected, in the resistor chain, and no resistor is connected across the ion activation region 44, i.e., between the electrically conductive ring members 22*c* and 50.

The DC voltage source 46 and the RF voltage source 48 may be controlled to accomplish a number of operational goals. For example, a DC voltage source (not shown) is controlled to maintain a desired electric field through the drift tube D1. Likewise, the DC voltage source 46, is controlled to maintain a desired electric field through the ion gate, funnel and ion activation region, G1/FR/IA under non-gating and non-ion activation operation. When it is desirable to "gate" (e.g., allow passage of) ions from the drift tube D1, into the drift tube D2, the voltage sources, such as voltage source 46 associated with each drift tube D1-D5 may be controlled such that various delay signals can be applied to the voltage sources. Via suitable choice of the delay period, ions having only a predefined mobility or range of mobilities may be passed from the drift tube D1, to the drift tube D2. This process of controlling the GO to allow passage from D1 to D2 only of ions having a predefined mobility or range of mobilities as previously described.

Ion activation, as this term will be defined hereinafter, can be made to selectively occur within the ion activation region 44 by suitably controlling the magnitude of the electric field within the region 44 via control of the voltages at FB and DF. In this embodiment, the electrically conductive ring member 50 that defines the first lens of the drift tube D2, contains a grid to prevent RF fields, resulting from the RF voltages produced by the RF voltage source 48, from extending into the drift tube D2. It will be appreciated that the RF voltage source 48 and/or another suitable RF voltage source may alternatively be electrically connected across the ion activation region 44 to create an RF electric field within the ion activation region 44 that is suitable for ion activation, as this term will be described hereinafter. It should also be appreciated that the ion gate, 40, 41, may alternatively be positioned at or near the end of the funnel region FR, e.g., at or near the last or back lens 42 of the funnel region FR.

The ion funnels F1-F5 provide for radial focusing of the ions to thereby allow high ion transmission through long drift tube regions. Generally, when the DC field in the funnel is at or above the field used in the adjacent drift tubes, high resolution mobility separations can be obtained. It is believed that as ions travel through a drift tube D1-D5, they diffuse radially outwardly into a sizeable cloud. When such ion clouds pass through an ion funnel of the type illustrated and described herein, F1-F5, the diffuse clouds collapse radially inwardly and are transmitted efficiently into the next drift tube region. It is also believed if the DC fields in the ion funnels are higher than in the adjacent drift tube regions it is possible to transmit nearly 100% of the ions through the ion funnels F1-F5. Alternatively, if the DC fields in the ion funnels is below a critical value, ions become increasingly trapped in the funnels. This latter feature makes possible the operational mode described in regard to FIG. 1. For example, combined with a gate that is located at the ion entrance end of a funnel, e.g., the ion gate and funnel region G1/FR illustrated and described herein may be used to trap and therefore accumulate mobility-selected ions from multiple ion packets.

The term "ion activation" has been used herein to identify a process that may be made to selectively occur within any of the ion activation regions of each ion funnel F1-F5. As used herein, "ion activation" is the process of inducing structural changes in at least some ions resulting from collisions of the ions with the buffer gas or gas mixture in the presence of a high electric field. The high electric field may be an AC electric field, and/or may be a high DC electric field, as is the case in ion activation region 44 as described hereinabove with respect to FIG. 5. In any case, the induced structural changes in the ions may take either of two forms. In the presence of sufficiently high electric fields, high energy collisions of ions with the buffer gas or gas mixture result in fragmentation of at least some of the ions, and ion activation under sufficiently high electric field conditions thus corresponds to ion fragmentation. In the presence of elevated electric fields that are not sufficiently high to result in ion fragmentation, collisions of ions with the buffer gas or gas mixture result in conformational changes, i.e., changes in the shape, of at least some of the ions. Ion activation, under electric field conditions that are sufficiently high but not high enough to result in ion fragmentation, thus corresponds to ion conformational changes. In either case, the structural changes induced in at least some of the ions results in different ion mobilities, which can be discerned when the structurally changed ions pass through a subsequent drift tube.

For example, in one illustrative embodiment, the apparatus 10 may also be illustratively used for gas phase purification of a single analyte from a complex mixture. Ions of interest selected may initially share the same mobility, but may be resolved via activation to a new structure. The ion may then be purified by selection of a new mobility at the funnel F4. The process allows one particular ion to be isolated from a complex mixture for analysis and/or reaction. This exemplary process involves the step-wise fragmentation of an ion and its fragments. An ion may be selected at the funnel F1 and fragmented in an activation region 44 of the funnel F1. The resulting fragments are separated in the funnel F1, the drift tube D3, and the funnel F2. To follow the pathway of a fragment, the fragment can be selected and fragmented in the funnel F3. The resulting fragments are transmitted to through the outlet tube 16. Ions may be transmitted to the funnel F4, where a specific fragment can be accumulated. Further fragmentation pathways on the accumulated ion may be studied by repeating the exemplary experimental sequence described herein.

It will be appreciated that the various voltage sources, such as VS and RF, may be controlled to accomplish various goals within the different regions of the illustrated embodiment of the apparatus 10. For example, the various voltage sources may be controlled to selectively gate (allow entrance of) ions from the ion source into drift tube D1, to selectively gate ions having only a predefined ion mobility or mobility range from D1 into D2, to selectively induce ion activation between D1 and D2. Furthermore, the selective gating allows ions not having the predefined mobility to reach the gate 26, which is energized causing these ions to lose their charge, thus no longer being compelled to move through the electric field manipulated within the conduit 12.

Figure 6:
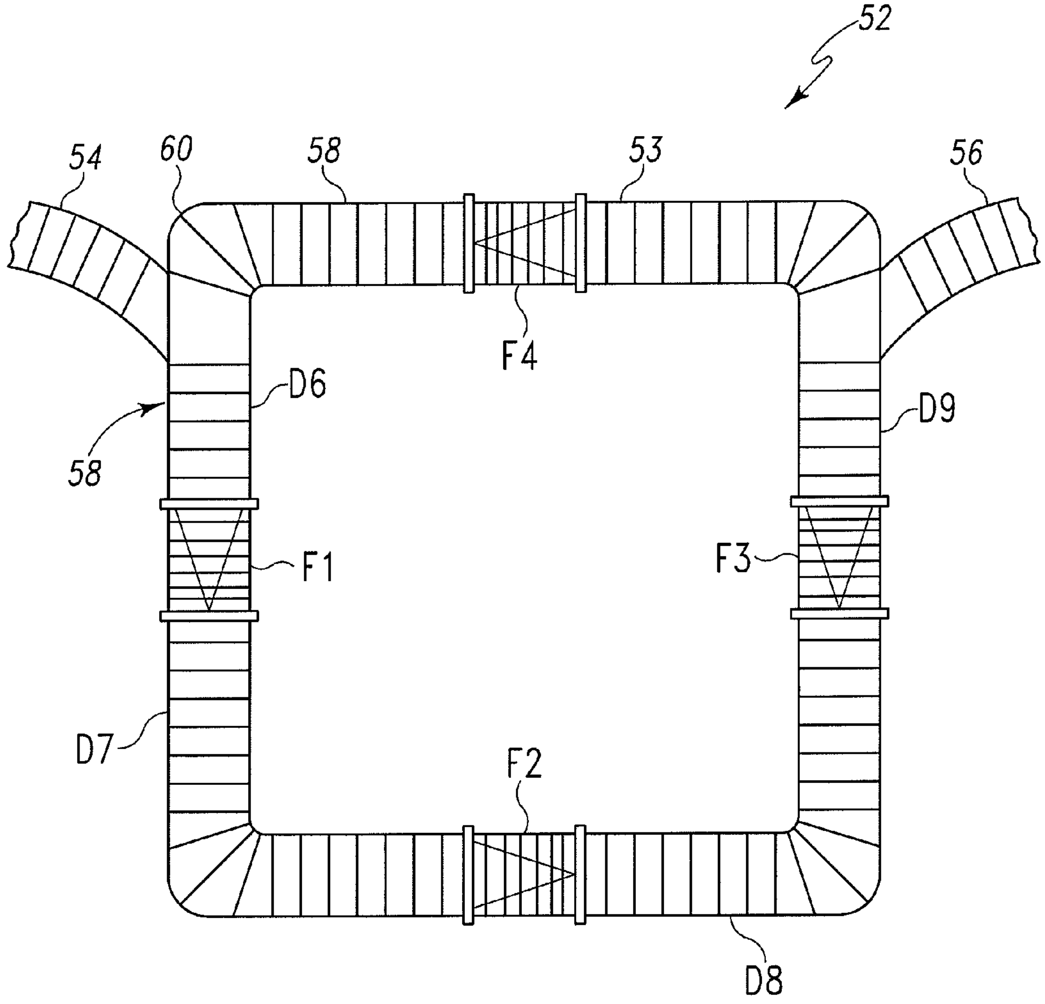
FIG. 6 is a side view of another apparatus for separating ions as a function of ion mobility.

Referring now to FIG. 6, an ion mobility apparatus 52 is shown. In this illustrative embodiment, the apparatus 52 includes features similar to apparatus 10, such as inlet tube 54, outlet tube 56, and conduit 53. The conduit 53 includes ion funnels F1-F4 and drift tubes D6-D9. Each drift tubes D6-D9 includes an arcuate portion 60 and a substantially straight portions 58. As illustrated in regard to drift tube D6, the substantially straight portions 58 are longer relative to the length of the arcuate portion 60. This illustrative configuration allows the time spent in the arcuate portion to be minimized with respect to the time spent in each drift tube. As previously stated, ions may diffuse as they travel through the drift tubes. If diffusion occurs prior to the reaching the arcuate portion, ions closer to the center of the cross-section of the conduit 53 traveling through the arcuate portions 60 may experience more force than those farther away from the center, which causes the more centrally-located ions to travel through the arcuate portion more quickly. This can diminish resolution in detecting specific ions. If the ion funnels F1-F4 are operated to allow ions to make multiple passes therethrough, each turn traveled around the conduit 53 will cause ions farther from the center of the conduit to the outside of the turn to lose more ground with respect to ions on the inside. Thus, resolution will get progressively worse. However, reducing the distance of the turns can alleviate the resolution diminution. It should be appreciated that other geometric shapes may be implemented other than those disclosed herein when assembling ion mobility apparatus. Furthermore, the conduits 12, 53, as well as rings 18, 20, 22, and 24, are disclosed herein as cylindrically or circularly shaped, however it should be appreciated that other geometric shapes may be implemented, such as rectangles for example.

FIGS. 7(*a*) and 7(*b*) provide results from experiments performed involving ions being transmitted through a linear drift tube/ion funnel and a single turn/linear drift tube/ion funnel. Both experiments used similar environments, namely, buffer gas pressure and applied voltages. FIG. 9(*a*) shows a time-based plot in which bradykinin [M+2H] ions were transmitted though a linear drift tube of 2.7 m and detected. FIG. 7(*b*) shows results from the same ion type being transmitted through a drift tube having a single turn and a 2.7 m linear portion and subsequently detected. The drift time is less in FIG. 7(*a*) as compared to FIG. 7(*b*) due to the increased length of the drift tubes. However, of note is the width of the peaks. The peak in FIG. 7(*a*) is narrower than that of FIG. 7(*b*) indicating that the turn diminishes the resolution. Thus, the configuration of FIG. 6 could be considered for implementation in order to increase resolution. It should be appreciated that other factors may be implemented to enhance resolution, such as buffer gas pressure, for example.

There are a plurality of advantages of the present disclosure arising from the various features of the apparatus and methods described herein. It will be noted that alternative embodiments of the apparatus and methods of the present disclosure may not include all of the features described yet still benefit from at least some of the advantages of such features. Those of ordinary skill in the art may readily devise their own implementations of an apparatus and method that incorporate one or more of the features of the present disclosure and fall within the spirit and scope of the present disclosure.

The invention claimed is:

1. An apparatus for separating ions based on ions, the apparatus comprising a conduit defining a closed path, the conduit responsive to application of at least a first voltage to establish an electric field about the closed path, the established electric field causing ions within the conduit to move about the closed path and separate while moving about the closed path based upon ion mobility.

2. The apparatus of claim 1 further comprising a plurality of voltage sources, wherein, the conduit comprises a plurality of drift tubes disposed along the closed path, and wherein, each of the plurality of drift tubes is electrically connected to at least one of the plurality of voltage sources.

3. The apparatus of claim 2, wherein the conduit comprises at least one ion funnel disposed within the closed path, and wherein, the at least one ion funnel is electrically connected to at least one of the plurality of voltage sources.

4. The apparatus of claim 3, wherein the conduit comprises a plurality of ion funnels disposed within the closed path, and wherein, the plurality of ion funnels and the plurality of drift tubes are all in fluid communication with one another.

5. The apparatus of claim 1 further comprising an inlet tube in fluid communication with the conduit, wherein, the inlet tube is responsive to application of at least a second voltage to establish an electric field in the inlet tube that transmits ions from the inlet tube into the conduit.

6. The apparatus of claim 1 further comprising an outlet tube in fluid communication with the conduit, wherein, the outlet tube is responsive to application of at least a second voltage to transmit at least some of the ions moving about the closed path into the outlet tube.

7. The apparatus of claim 6 wherein the conduit comprises a first gate electrode and the outlet tube comprises a second gate electrode, and wherein the at least a first voltage comprises a third voltage and a fourth voltage that is different from the third voltage, and wherein the at least a second voltage comprises a fifth voltage and a sixth voltage that is different from the fifth voltage, the first and second gate electrodes responsive to the third and fourth voltages respectively to cause the ions moving about the closed path to continue to move about the closed path, the first and second gate electrodes responsive to fifth and sixth voltages respectively to transmit the at least some of the ions moving about the closed path into the outlet tube.

8. A method for separating ions comprising:

transmitting ions into a first conduit which defines a first closed path, and establishing a first electric field about the first conduit to cause the ions to move about the first closed path and separate while moving about the first closed path based on ion mobility.

9. The method of claim 8 wherein transmitting ions into the first conduit comprises transmitting the ions into the first conduit via an inlet tube integrally formed with the first conduit.

10. The method of claim 8 further comprising transmitting at least some of the ions moving about the first closed path out of the first conduit.

11. The method of claim 10 wherein transmitting at least some of the ions moving about the first closed path out of the first conduit comprises transmitting the ions out of the first conduit via an outlet tube integrally formed with the first conduit.

12. The method of claim 10 further comprising allowing the ions to move at least one revolution about the first closed path before transmitting the at least some of the ions out of the first conduit.

13. The method of claim 10 further comprising allowing the ions to move multiple revolutions about the first closed path before transmitting the at least some of the ions out of the first conduit.

14. The method of claim 10 further comprising:

transmitting the at least some of the ions transmitted out of the first conduit into a second conduit which defines a second closed path, and establishing a second electric field about the second conduit to cause the at least some of the ions to move about the second closed path and separate while moving about the second closed path based on ion mobility.

15. The method of claim 10 further comprising:

transmitting a first subset of the at least some of the ions transmitted out of the first conduit into a second conduit which defines a second closed path, establishing a second electric field about the second conduit to cause the first subset of the at least some of the ions to move about the second closed path and separate while moving about the second closed path based on ion mobility, transmitting a second subset of the at least some of the ions transmitted out of the first conduit into a third conduit which defines a third closed path, and establishing a third electric field about the third conduit to cause the second subset of the at least some of the ions to move about the third closed path and separate while moving about the third closed path based on ion mobility.

16. The method of claim 8 further comprising trapping at least some of the ions moving about the first closed path, at least temporarily, at one or more locations within the first conduit.

17. The method of claim 16 wherein trapping at least some of the ions moving about the first closed path comprises temporarily trapping only ions having a predefined ion mobility or range of ion mobilities.

18. The method of claim 8 wherein the first conduit comprises a plurality of drift tubes disposed along the first closed path, and wherein the method further comprises selectively allowing entrance only of ions having a predefined mobility or range of ion mobilities into at least one of the plurality of drift tubes.

19. The method of claim 8 further comprising radially focusing the ions moving about the first closed path at one or more locations within the first conduit.

20. The method of claim 8 further comprising inducing structural changes in at least some of the ions moving about the first closed path at one or more locations within the first conduit.

21. The method of claim 20 wherein inducing structural changes in at least some of the ions comprises fragmenting the at least some of the ions.

22. The method of claim 20 wherein inducing structural changes in at least some of the ions comprises inducing conformational changes in the at least some of the ions.

* * * * *

UNITED STATES PATENT AND TRADEMARK OFFICE

CERTIFICATE OF CORRECTION

PATENT NO. : 8,362,420 B2
APPLICATION NO. : 12/439108
DATED : January 29, 2013
INVENTOR(S) : Clemmer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1004 days.

Signed and Sealed this
First Day of September, 2015

Michelle K. Lee
*Director of the United States Patent and Trademark Office*